UNITED STATES PATENT OFFICE.

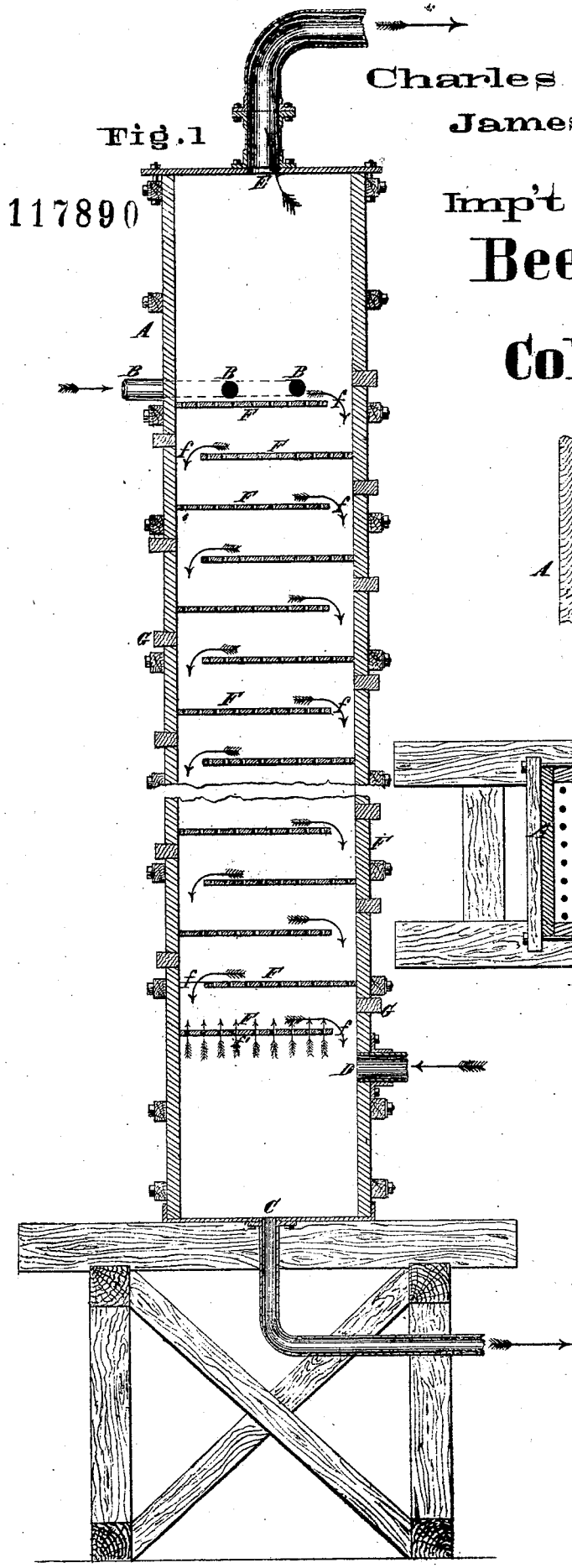
Charles B. Jarvis & James W. Gaff.
PATENTED AUG 8 1871
Imp't in
Beer Heaters
and
Column Stills
Fig. 2
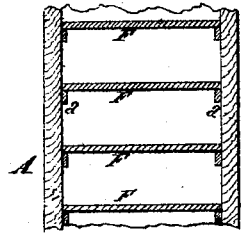
Fig. 3
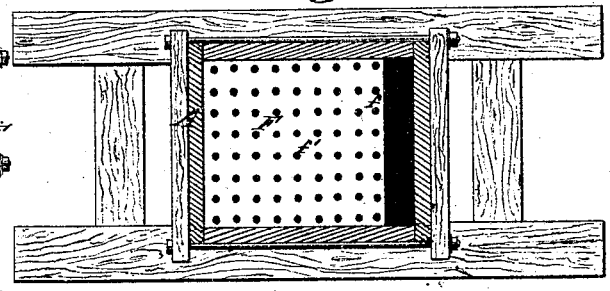
Inventor
Charles B. Jarvis &
James W. Gaff
By F. Millward
Attorney
Attest
Henry Millward
Elisha F. Layman

CHARLES B. JARVIS AND JAMES W. GOFF, OF CINCINNATI, OHIO.

IMPROVEMENT IN STILLS FOR BEER, &c.

Specification forming part of Letters Patent No. 117,890, dated August 8, 1871.

*To all whom it may concern:*

Be it known that we, CHARLES B. JARVIS and JAMES W. GOFF, both of Cincinnati, Hamilton county, State of Ohio, have invented a certain new and useful Improvement in Beer-Heaters and Column-Stills; and we do hereby declare the following to be a sufficiently full, clear, and exact description thereof to enable one skilled in the art to which our invention appertains to make and use it, reference being had to the accompanying drawing making a part of this specification.

Our invention relates to the construction of heaters or stills for evaporating alcoholic vapor from fermented liquor; and consists, in connection with an inclosed chamber, of a supply beer-pipe or pipes, a pipe for the discharge of heated, beer or slop, a steam-pipe, and a vapor exit-pipe of a series of plates, each a short distance above or below another, with open spaces at alternate ends of the plates for the passage of the fermented liquor, and perforations, if desirable, for the upward passage of steam; the object of our invention being to distribute the beer or fermented liquor in a thin layer over the plates, give the liquor a circuitous passage to economize space, and in its passage to induce a rapid evaporation of the alcoholic spirits by submitting this layer or thin stream to the continuous action of steam upon the under side of the plates.

Figure 1 is a vertical section of our improved apparatus. Fig. 2 is a portion of the still in vertical section at right angles to that of Fig. 1. Fig. 3 is a horizontal cross-section.

A is the shell or casing of the heater or still, fitted with a tight top and bottom, and side clamps, as shown. Besides the casing A the other essential features of our apparatus consist of the supply beer-pipe or pipes B, the discharge-pipe C for heated beer or slop, the steam-supply pipe D, the vapor-exit pipe E, and the series of plates F with openings $f$ at alternate ends. The plates rest upon the battens $a$, and they fit tightly at the sides, as shown in Fig. 2. At one end of each plate, at alternate ends, openings $f$ are provided for the free passage of the beer past the plates at opposite sides of the box in succession, in the manner shown by arrows in Fig. 1. The steam is permitted to pass upward through the same openings $f$, and it serves to so highly heat the plates F by contact with the under sides of the same that the beer or fermented liquor in passing over the plates in a thin stream is heated to such a degree of temperature that the alcoholic spirits contained in the liquor is evaporated rapidly and passes off through pipe E to the customary condenser. To facilitate the upward passage of the steam when very rapid evaporation is desired at the expense of "high proof," perforations $f''$ are provided in the plates F, as shown. The liquor passing off at pipe C may enter into a redistilling apparatus or pass off as slop. The plates F may be made of copper or other good heat-conducting material, and the holes $f$ should be small and few in number. Plugs G are designed to facilitate inspection of the still.

We are aware that stills of this class have heretofore been constructed with a series of perforated diaphragms, one above the other, and extending entirely across the casing, and do not, therefore, claim this feature broadly, but only when there is an opening between one end of each plate and the case upon alternate ends.

We claim—

In a beer-heater or still, constructed substantially as described, the combination of the casing A, plates F, and openings $f$ upon alternate ends of the plates for the upward passage of the steam and downward passage of the beer simultaneously, in the manner and for the purpose set forth.

In testimony of which invention we hereunto set our hands.

CHARLES B. JARVIS.
JAMES W. GOFF.

Witnesses:
 FRANK MILLWARD,
 I. L. WARTMANN.